(12) United States Patent
Kim et al.

(10) Patent No.: US 12,241,517 B2
(45) Date of Patent: Mar. 4, 2025

(54) VIBRATION REDUCTION DEVICE

(71) Applicant: Hyundai Transys Inc., Seosan-si (KR)

(72) Inventors: Gunwoo Kim, Hwaseong-si (KR); Byung Min Lee, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/475,511

(22) Filed: Sep. 27, 2023

(65) Prior Publication Data

US 2024/0102532 A1  Mar. 28, 2024

(30) Foreign Application Priority Data

Sep. 28, 2022  (KR) ........................ 10-2022-0123707

(51) Int. Cl.
*F16F 15/14* (2006.01)

(52) U.S. Cl.
CPC .... *F16F 15/1485* (2013.01); *F16F 2224/025* (2013.01); *F16F 2232/02* (2013.01)

(58) Field of Classification Search
CPC ................ F16F 15/145; F16F 15/1485; F16F 2224/025; F16F 2232/02
See application file for complete search history.

(56) References Cited

U.S. PATENT DOCUMENTS

| 9,032,837 | B2 * | 5/2015 | Klotz | F16F 15/145 |
| | | | | 74/574.2 |
| 9,360,081 | B2 * | 6/2016 | Lee | F16F 15/13492 |
| 9,797,471 | B2 * | 10/2017 | Kram | F16F 15/145 |
| 10,316,930 | B2 * | 6/2019 | Verhoog | F16F 15/145 |
| 2019/0170211 | A1 * | 6/2019 | Bouche | F16F 15/145 |

FOREIGN PATENT DOCUMENTS

| DE | 102016125380 A1 | 6/2018 | |
| DE | 102018202580 A1 * | 8/2019 | ............ F16F 15/145 |
| DE | 102020104389 A1 | 8/2020 | |
| EP | 2607743 B1 * | 2/2015 | ............ F16F 15/145 |
| EP | 3101311 B1 * | 9/2017 | ............ F16F 15/145 |
| KR | 10-1694049 B1 | 1/2017 | |
| KR | 10-1770063 B1 | 8/2017 | |
| KR | 2019-0030752 A | 3/2019 | |
| WO | 2018020158 A1 | 2/2018 | |
| WO | WO-2021122241 A1 * | 6/2021 | ............ F16F 15/145 |

OTHER PUBLICATIONS

Machine translation of EP 2607743 B1, obtained from FIT database (Year: 2015).*
Translation of WO 2018020158 A1, obtained from Espacenet (Year: 2021).*
Winter, "Office Action for DE Application No. 10 2023 126 121.5", May 21, 2024, DPMA, Muchen, Germany.

* cited by examiner

*Primary Examiner* — Thomas C Diaz

(74) *Attorney, Agent, or Firm* — Bridgeway IP Law Group, PLLC; Jihun Kim

(57) ABSTRACT

A vibration reduction device includes a support plate, one side mass positioned at an edge of one side surface of the support plate, the other side mass disposed to be opposite to one side mass and positioned at an edge of the other side surface of the support plate, and an impact absorbing member coupled to the support plate and configured to come into contact with one side mass or the other side mass.

9 Claims, 3 Drawing Sheets

VIBRATION REDUCTION DEVICE

CROSS-REFERENCE TO RELATED APPLICATIONS

This application claims priority to and the benefit of Korean Patent Application No. 10-2022-0123707 filed in the Korean Intellectual Property Office on Sep. 28, 2022, the entire contents of which are incorporated herein by reference.

TECHNICAL FIELD

The present invention relates to a vibration reduction device mounted in a torque converter.

BACKGROUND ART

In general, a vibration reduction device, such as a centrifugal pendulum absorber (CPA), for canceling out vibration and noise of an engine may be mounted in a torque converter. The vibration reduction device, such as the centrifugal pendulum absorber, may serve to cancel out overall vibration and noise by generating vibration in an opposite direction when the internal components of the torque converter and internal components of an intercooler are rotated at high speed.

The vibration reduction device, such as the centrifugal pendulum absorber, may assist in reducing noise and vibration generated inside and outside a vehicle and improving fuel economy and extending lifespan.

The vibration reduction device, such as the centrifugal pendulum absorber, may be used integrally with a clutch, the torque converter, a dual mass flywheel (DMF), and the like.

The vibration reduction device, such as the centrifugal pendulum absorber, may include four or more masses, two rollers, one support plate, two spacers, and four stoppers. The mass, the support plate, and the spacer may each be made of metal, and the stopper may be made of rubber.

However, the vibration reduction device, such as the centrifugal pendulum absorber in the related art, gradually loses centrifugal force when the engine is turned off, and the metal components are dropped by their own weights at the moment when the centrifugal force is lower than a weight of the mass, which may cause metallic collision noise because of a collision between the metal components. The metallic collision noise is disadvantageous in terms of vehicle NVH (noise, vibration, harshness) evaluation and sometimes causes user's complaint. In addition, a stopper made of rubber is provided to prevent a collision between the metal components, but there is a limitation in absorbing the metallic collision noise.

DOCUMENT OF RELATED ART

Patent Document (Patent Document 1) Korean Patent No. 10-1694049 (published on Jan. 9, 2017)

SUMMARY OF THE INVENTION

The present invention has been made in an effort to provide a vibration reduction device, in which an impact absorbing member having an over-molding portion may be mounted on a steel plate, thereby improving durability of a stopper and preventing metallic impact noise caused by a collision between another metal component and a mass that moves while losing a centrifugal force when an engine is turned off.

An exemplary embodiment of the present invention provides a vibration reduction device including: a support plate; one side mass positioned at an edge of one side surface of the support plate; the other side mass disposed to be opposite to one side mass and positioned at an edge of the other side surface of the support plate; and an impact absorbing member coupled to the support plate and configured to come into contact with one side mass or the other side mass.

Pendulum holes may be provided along an edge of the support plate and accommodate rollers, spacers configured to support the rollers may be provided in the pendulum holes, stoppers coupled to two opposite sides of the spacers may be provided in the pendulum holes, and the spacers may be connected to one side mass and the other side mass.

The impact absorbing member may include: a ring portion coupled to a coupling surface disposed between the pendulum hole and an inner-diameter portion of the support plate; and a plurality of over-molding portions formed along an outer periphery of the ring portion and configured to come into contact with left and right lower end edge portions of one side mass or the other side mass.

The over-molding portion may protrude in a semi-circular shape.

The impact absorbing member and the stopper may each be made of rubber.

The support plate, one side mass, the other side mass, and the spacer may each be made of metal.

The spacers may be connected to one side mass and the other side mass by riveting.

A central portion of the over-molding portion may be connected to the support plate by riveting.

The support plate may be mounted in a torque converter.

According to the present invention, the impact absorbing member having the over-molding portion may be mounted on the steel plate, thereby improving durability of the stopper and preventing the metallic impact noise caused by a collision between another metal component and the mass that moves while losing the centrifugal force when the engine is turned off.

According to the present invention, the vibration reduction device may provide the effect of greatly improving NVH (noise, vibration, harshness) properties.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
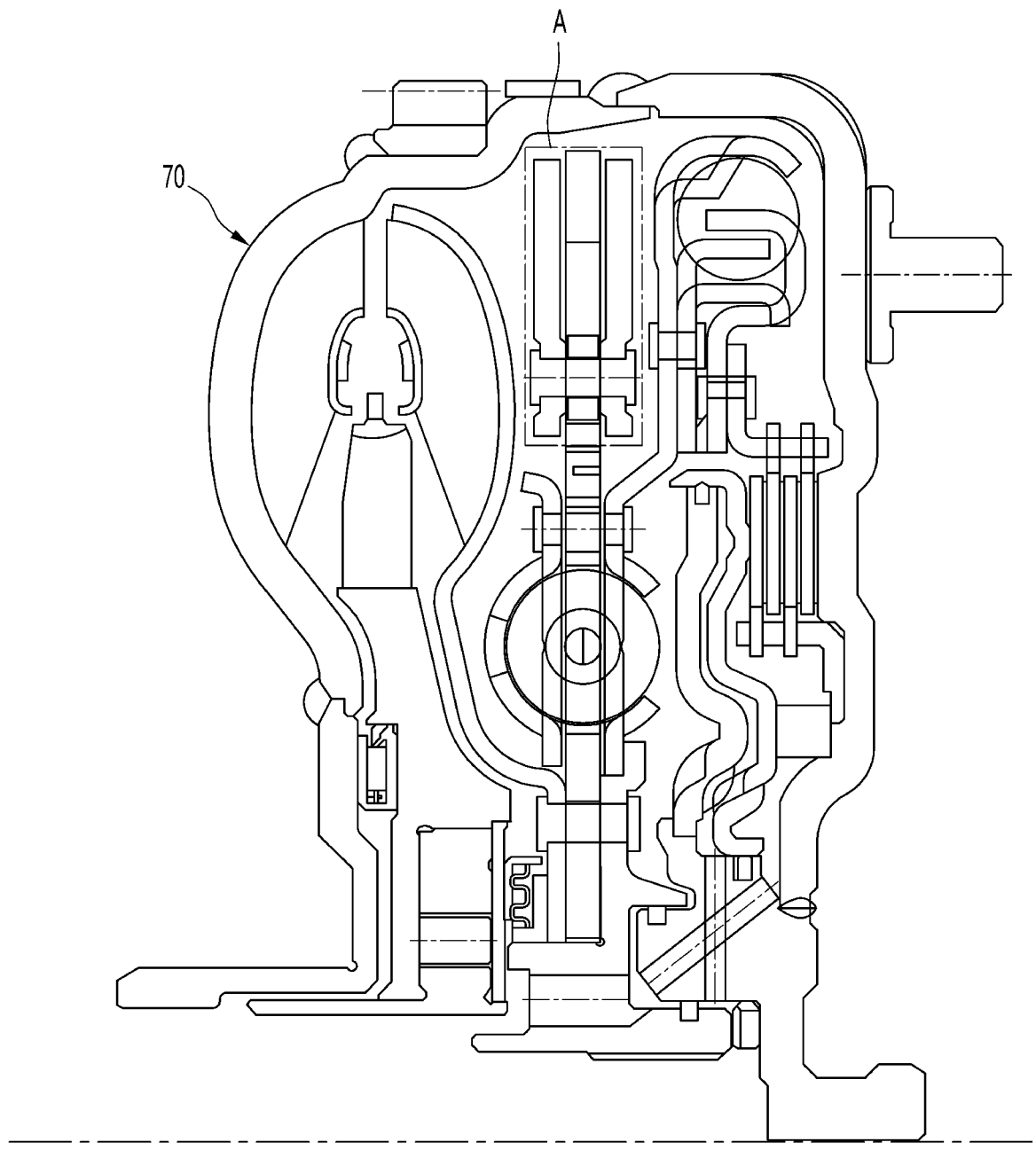
FIG. 1 is a view illustrating a state in which a vibration reduction device according to an exemplary embodiment of the present invention is mounted in a torque converter.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
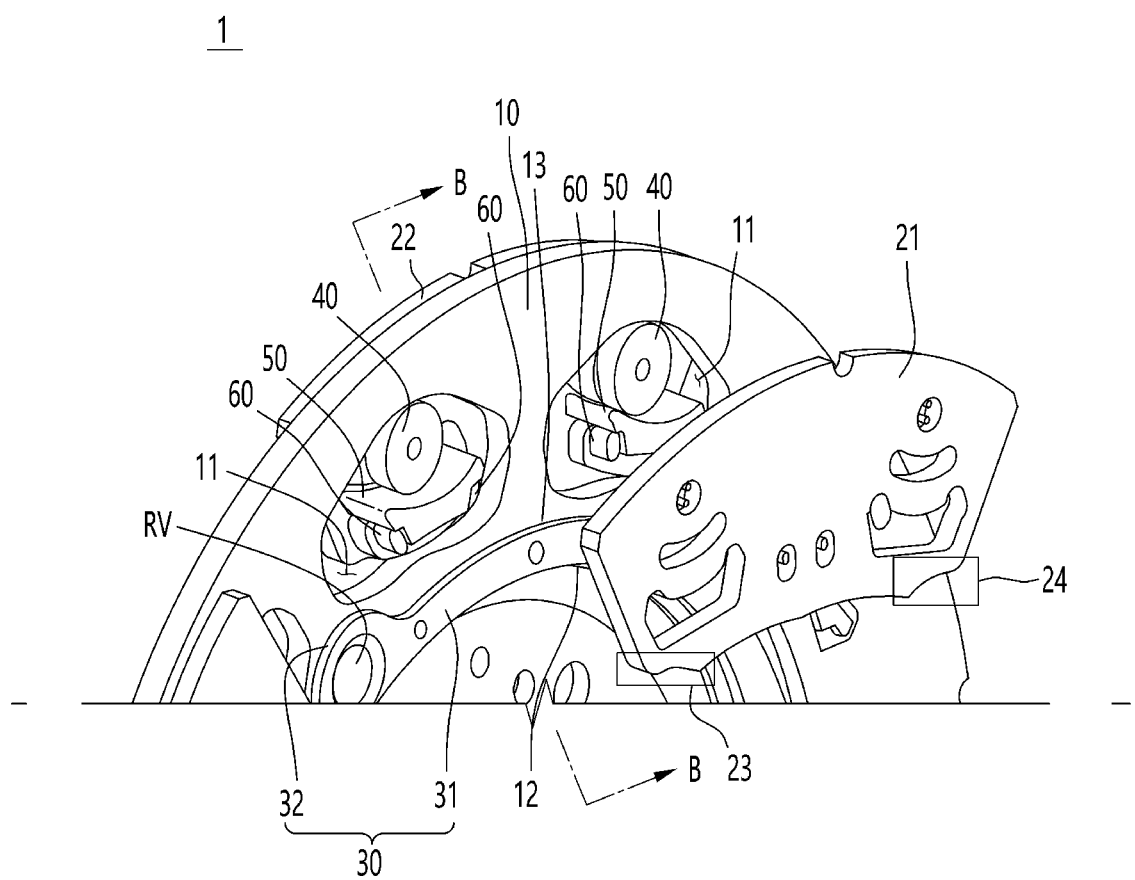
FIG. 2 is an enlarged view of part A in FIG. 1, i.e., a perspective view illustrating the vibration reduction device.
Figure 3:
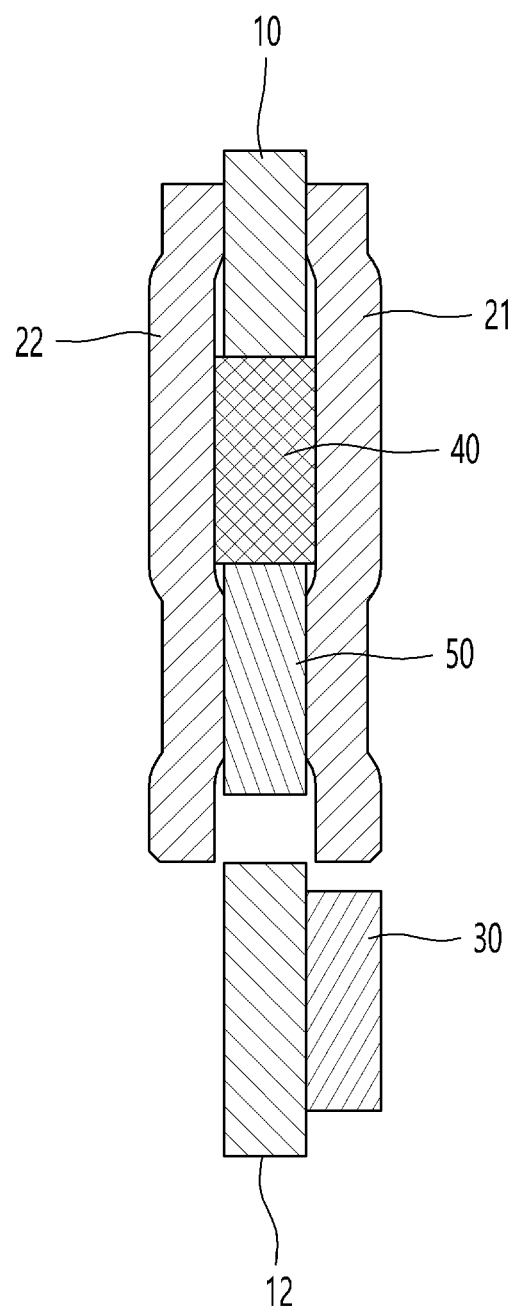
FIG. 3 is a cross-sectional view taken along line B-B in FIG. 2.

FIG. 1 is a view illustrating a state in which a vibration reduction device according to an exemplary embodiment of the present invention is mounted in a torque converter, FIG. 2 is an enlarged view of part A in FIG. 1, i.e., a perspective view illustrating the vibration reduction device, and FIG. 3 is a cross-sectional view taken along line B-B in FIG. 2.

As illustrated in FIGS. 1 to 3, a vibration reduction device 1 of the present invention may be mounted in a torque converter 70. For example, the vibration reduction device 1 of the present invention may be a centrifugal pendulum absorber (CPA) that absorbs vibration by using the pendulum principle. The centrifugal pendulum absorber may serve to cancel out overall vibration and noise by generating vibration in an opposite direction when the torque converter rotates at high speed.

The present invention includes a support plate 10 mounted in the torque converter 70, one side mass 21 positioned on one side surface of the support plate 10, the other side mass 22 positioned on the other side surface of the support plate 10, and an impact absorbing member 30 coupled to the support plate 10 and configured to come into contact with one side mass 21 or the other side mass 22.

The support plate 10 may be made of metal and configured in the form of a thin circular plate. For example, the support plate 10 may be configured as a steel plate.

Pendulum holes 11 may be provided along an edge of the support plate 10. Rollers 40 may be accommodated in the pendulum hole 11.

A spacer 50 configured to support the roller 40 may be provided in the pendulum hole 11, and stoppers 60 coupled to two opposite sides of the spacer 50 may be provided in the pendulum hole 11.

The spacers 50 may be connected to one side mass 21 and the other side mass 22 by riveting RV. For example, the spacer 50 may be made of metal.

For example, the stopper 60 may be made of rubber capable of absorbing vibration and impact.

One side mass 21 and the other side mass 22 may be provided at two opposite sides with the support plate 10 interposed therebetween. One side mass 21 and the other side mass 22 may each be made of metal. When irregular vibration of an engine (not illustrated) is transmitted, one side mass 21 and the other side mass 22 may attenuate the vibration while moving in a direction opposite to the vibration of the engine.

One side mass 21 may be positioned at an edge of one side surface of the support plate 10. Left and right lower end edge portions 23 and 24 of one side mass 21 may come into contact with the impact absorbing member 30. For example, one side mass 21 may be made of metal.

The other side mass 22 may be positioned at an edge of the other side surface of the support plate 10 and disposed to be opposite to one side mass.

One side mass 21, the other side mass 22, the spacers 50, and the stoppers 60 may be integrally coupled and integrally move.

The impact absorbing member 30 includes a ring portion 31, and an over-molding portion 32 extending along an outer periphery of the ring portion 31. The impact absorbing member 30 may be made of rubber capable of absorbing vibration and impact.

The ring portion 31 may be coupled to a coupling surface 13 of the support plate 10 that is directed toward one side mass 21 and disposed between the pendulum hole 11 and an inner-diameter portion 12.

The over-molding portion 32 may be provided as a plurality of over-molding portions provided at equal intervals along an outer periphery of the ring portion 31 so as to be able to come into contact with the left and right lower end edge portions 23 and 24 of one side mass 21 or the other side mass 22.

A portion between a center of the over-molding portion 32 and a center of another over-molding portion 32, which faces the center of the over-molding portion 32, may be formed to conform to a width between the left and right lower end edge portions 23 and 24 so that the over-molding portions 32 may come into contact with the left and right lower end edge portions 23 and 24 of one side mass 21 or the other side mass 22.

The over-molding portion 32 may protrude in a semi-circular shape. A central portion of the over-molding portion 32 may be connected to the support plate 10 by riveting RV.

When the torque converter 70 rotates at high speed, one side mass 21 and the other side mass 22 of the vibration reduction device 1 of the present invention may move in the direction opposite to the irregular vibration of the engine, thereby attenuating vibration.

Specifically, because one side mass 21 and the other side mass 22 are integrally coupled to the spacers 50 by riveting RV, the spacers 50 and the rollers 40, to which the centrifugal force is applied when the vibration reduction device 1 rotates, are biased in the pendulum holes 11 toward the outer-diameter portion of the support plate 10, such that the spacers 50 and the rollers 40 may move in the direction opposite to the vibration of the engine.

The vibration may be attenuated because one side mass 21 and the other side mass 22 move in the direction opposite to the vibration of the engine in conjunction with the motions of the spacers 50 that are in close contact with the rollers 40 and move in the pendulum holes 11 in the direction opposite to the vibration of the engine.

A vibration reduction device in the related art gradually loses a centrifugal force when an engine is turned off, and metallic collision noise occurs because of a collision with metal components having different masses at the moment when the centrifugal force is lower than weights of masses at two opposite sides. A stopper made of rubber is provided, but there is a limitation in absorbing the metallic collision noise.

In contrast, the present invention may absorb the metallic collision noise in the related art because the impact absorbing member 30 coupled to the support plate 10 serves as a stopper, in addition to the stopper 60, to prevent one side mass 21 from colliding with the support plate 10 when the engine is turned off.

Specifically, when one side mass 21, which loses the centrifugal force when the engine is turned off and stopped, moves, the left and right lower end edge portions 23 and 24 of one side mass 21 may come into contact with the over-molding portion 32 of the impact absorbing member 30, thereby absorbing impact.

As described above, according to the present invention, the impact absorbing member having the over-molding portion may be mounted on the steel plate, thereby improving durability of the stopper and preventing the metallic impact noise caused by a collision between another metal component and the mass that moves while losing the centrifugal force when the engine is turned off. In addition, according to the present invention, the vibration reduction device may provide the effect of greatly improving NVH (noise, vibration, harshness) properties.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A vibration reduction device comprising:
   a support plate;
   a first side mass positioned at an edge of one side surface of the support plate;
   a second side mass disposed to be opposite to the first side mass and positioned at an edge of another side surface of the support plate; and
   an impact absorbing member coupled to the support plate and configured to come into contact with the first side mass or the second side mass,
   wherein the impact absorbing member comprises:
   a ring portion coupled to a coupling surface defined along a circumferential surface of the support plate adjacent to an inner-circumferential portion of the support plate, the ring portion having a smooth surface facing the first side mass or the second side mass; and
   a plurality of over-molding portions defined along an outer periphery of the ring portion,
   wherein a width between a center of one of the plurality of over-molding portions and a center of another adjacent one of the plurality of over-molding portions conforms to a width between left and right lower end edge portions of the first side mass or the second side mass, such that the one of the plurality of over-molding portions and the another adjacent one of the plurality of over-molding portions are in contact with the left and right lower end edge portions of the first side mass or the second side mass.

2. The vibration reduction device of claim 1,
   wherein the support plate includes pendulum holes arranged along an edge of the support plate to accommodate rollers,
   wherein the vibration reduction device further comprises:
   spacers configured to support the rollers, each of the spacers being disposed in each of the pendulum holes; and
   stoppers coupled to two opposite sides of each of the spacers, each of the stoppers being disposed in each of the pendulum holes,
   wherein each of the spacers is connected to both the first side mass and the second side mass.

3. The vibration reduction device of claim 2,
   wherein the coupling surface is defined between the pendulum holes and the inner-circumferential portion of the support plate.

4. The vibration reduction device of claim 3,
   wherein each of the plurality of over-molding portions protrudes in a semi-circular shape.

5. The vibration reduction device of claim 3,
   wherein a central portion of each of the plurality of over-molding portions is connected to the support plate by riveting.

6. The vibration reduction device of claim 2,
   wherein the impact absorbing member and the stoppers have rubber material.

7. The vibration reduction device of claim 2,
   wherein the support plate, the first side mass, the second side mass, and the spacers have metal material.

8. The vibration reduction device of claim 2,
   wherein the spacers are connected to the first side mass and the second side mass.

9. The vibration reduction device of claim 1, wherein the support plate is mounted in a torque converter.

* * * * *